Sept. 1, 1953 C. B. VOGEL 2,651,027
WELL LOGGING
Filed Oct. 1, 1949 3 Sheets-Sheet 1
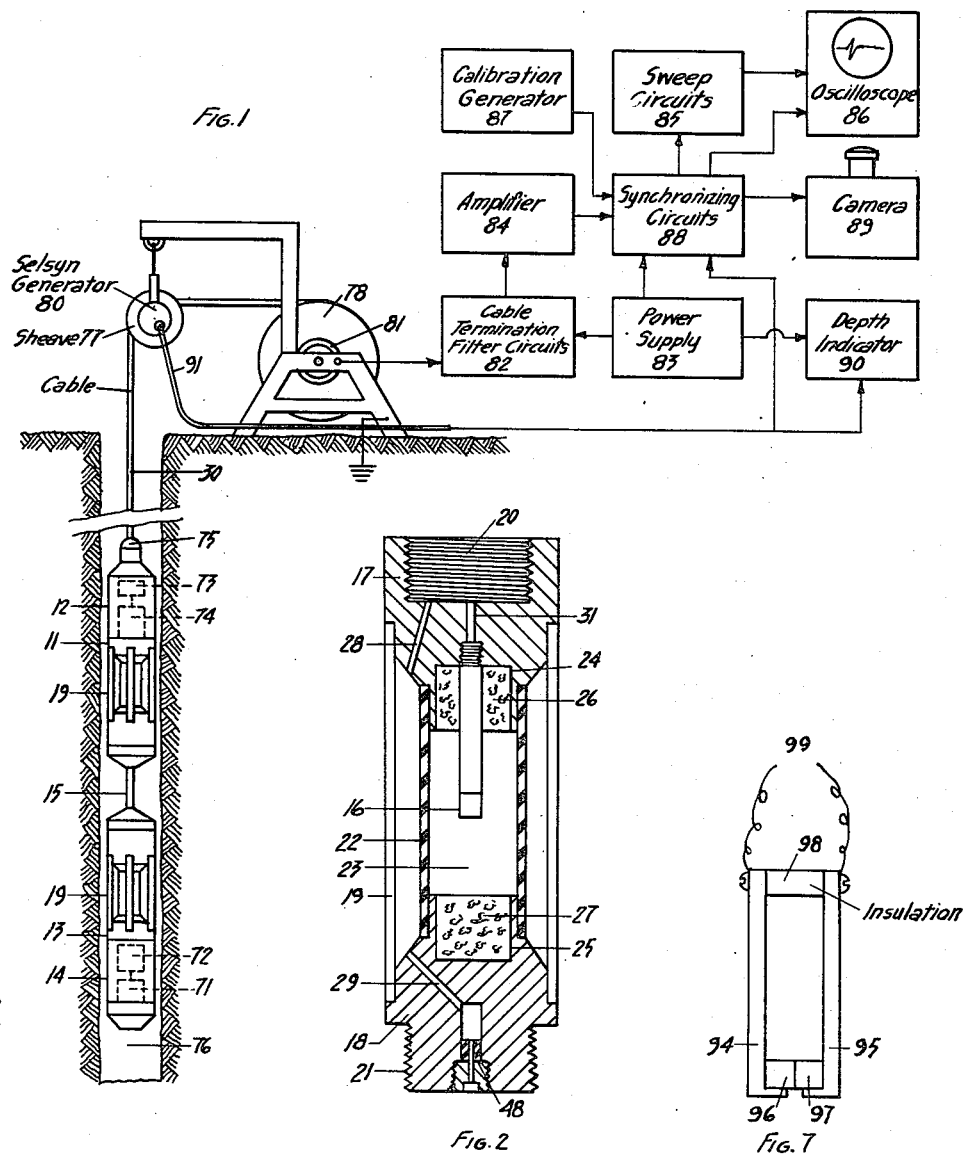
Inventor: Charles B. Vogel
By: His Attorney Sept. 1, 1953 C. B. VOGEL 2,651,027
WELL LOGGING
Filed Oct. 1, 1949 3 Sheets-Sheet 2
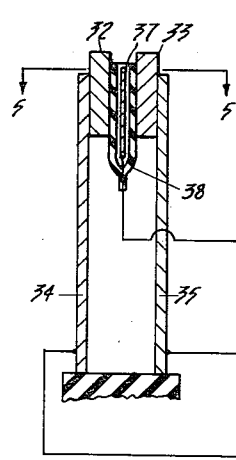
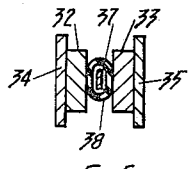
Fig. 5
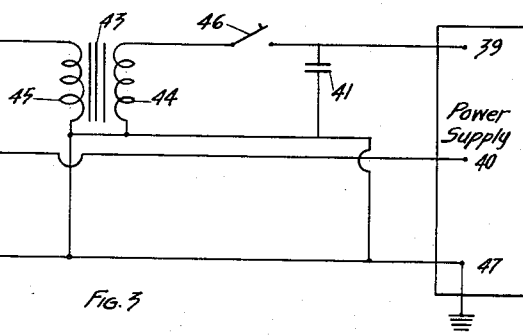
Fig. 3
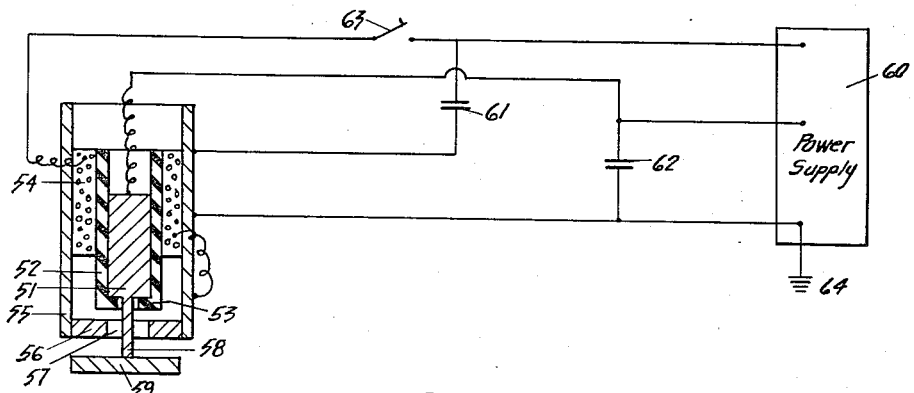
Fig. 4
Inventor: Charles B. Vogel
By: His Attorney Sept. 1, 1953  C. B. VOGEL  2,651,027
WELL LOGGING Filed Oct. 1, 1949  3 Sheets-Sheet 3

Inventor: Charles B. Vogel
By: 
His Attorney

Patented Sept. 1, 1953

2,651,027

UNITED STATES PATENT OFFICE 2,651,027

WELL LOGGING

Charles B. Vogel, Houston, Tex., assignor to Shell Development Company, San Francisco, Calif., a corporation of Delaware Application October 1, 1949, Serial No. 119,128

4 Claims. (Cl. 340—18)

This invention pertains to the logging of the formations traversed by a borehole, and relates more particularly to an improved method and apparatus for generating and measuring the speed of travel of mechanical impulses in said borehole and formations, whereby the character of said formations can be investigated and logged.

Identification of the various strata of earth formations adjacent a borehole has been heretofore accomplished chiefly by coring or measurement of the electrical properties of these strata such as spontaneous potentials, resistivities, and the like. It is, however, likewise possible to employ seismic or acoustic waves to study the various formations, logging being in such case based on the fact that rock formations of different character transmit seismic waves at different velocities. Thus, the velocity of longitudinal seismic waves in limestone is about 15,000–18,000 feet per second, in shale 7,000 to 10,000 feet per second, in sandstone 5,000 to 7,000 feet per second, and in water or drilling fluid 5,000 feet per second. By plotting the seismic wave velocity against the depth, the changes which occur when the lithologic character of the beds changes will be made apparent. Given a knowledge of the ranges of velocities characteristic of various types of rock, etc., the kind and character of the formations encountered can be readily determined.

The velocity of longitudinal seismic waves through the various strata can be determined by lowering into a well borehole means for generating and receiving or detecting mechanical waves, which term may be used here generally to define all seismic waves or impulses, that is impulses traveling through the earth, or the water (including fluids standing in boreholes), such as acoustic, compressional, distortional, surface, boundary, and other types of waves. These waves can be generated at one point in the borehole and received by one or more receivers at a point above and/or below the point of generation. The cables or conductors from the sound transmitting and receiving means are electrically connected, at the surface, to any suitable instruments capable of recording or indicating the velocity of propagation of a wave traveling through the formation from the transmitter to the receiver, the shape or image of said waves, etc.

The transmitters which may be used for this purpose are seismic, magnetic or piezo-electric oscillators, acoustic generators, etc. In general, the oscillators generate a continuous series of waves or impulses directed against and into the walls of the borehole in a direction normal to the axis of the borehole. Records of a continuous series of impulses picked up by a receiver are however sometimes difficult to interpret, especially when the initial impulses generated are not sufficiently sharp, due to the impossibility of putting sufficient energy thereinto, and the impulses leaving the transmitter are scattered in all directions. If means such as blasting caps, explosive charges, etc., are used in an effort to put sufficient energy into an impulse, the additional difficulty arises of the impulse source being limited to the emission of one or at most of a very few impulses.

It is an object of the present invention to provide a seismic velocity well logging apparatus of simple and rugged construction having a transmitter adapted to generate a sharp nonoscillatory mechanical pulse or wave of relatively high energy and having an extremely steep wave front.

It is also an object of this invention to provide a system of the above type wherein said mechanical wave is originated in the liquid within a well by passing an electric spark discharge between two electrodes through the liquid in which said electrodes are immersed.

Another object of the present invention is to provide a velocity well logging apparatus adapted to be lowered into a well and electrically connected to the recording equipment and a power source at the surface of the well by a single conductor cable.

Another object of the invention is to provide an apparatus and a method for recording a series of successive sharp pulses picked up by the receiver of the velocity well logging apparatus, whereby the velocity of seismic impulses in various strata may be determined, and the well may be logged as to these strata.

These and other objects of this invention will be understood from the following description of a preferred embodiment of the invention as shown in the accompanying drawing, wherein:

Figure 1 is a diagram of the subsurface portion of the present apparatus and of the auxiliary recording and power supply units and circuits electrically connected thereto by a cable.

Figure 2 is a view, in longitudinal cross section, of the transmitter or receiver housing of this invention.

Figures 3 and 4 are cross-sectional views of two embodiments of the present transmitter connected to a suitable electrical circuit.

Figure 5 is a cross-sectional view taken along the line 5—5 of Figure 3.

Figure 7 is a plan view of a pair of electrodes.

Figure 6:
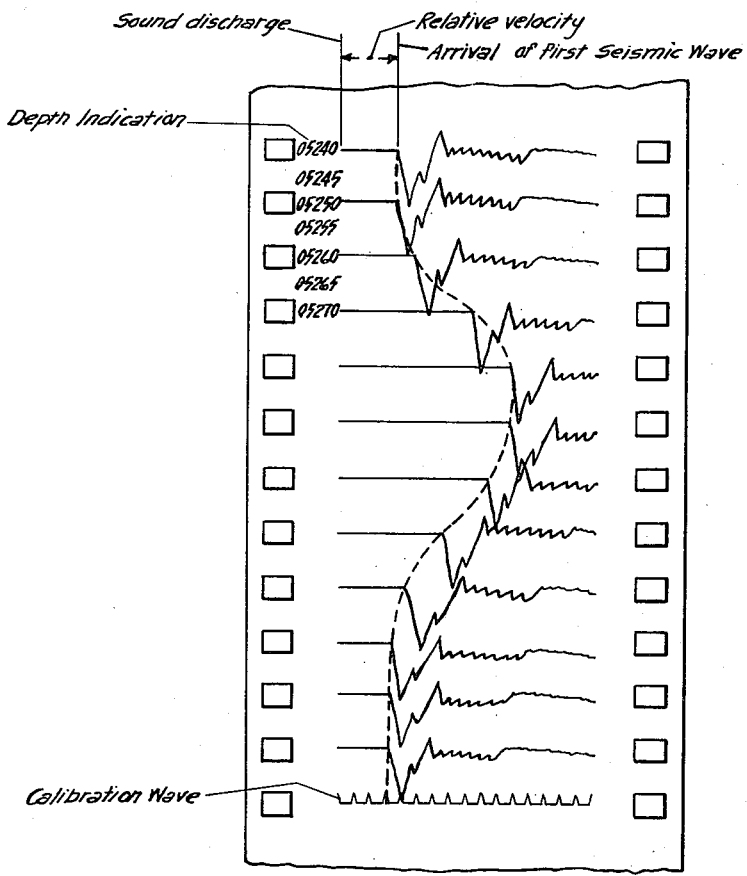
Figure 6 is a typical record obtained by means of the present invention.

As shown in Figure 1, the present well-logging apparatus comprises as equipment adapted to be lowered into a well or borehole, a transmitter or wave generator 11 having its related electrical equipment contained in a suitable fluidtight housing 12 which may be secured to said transmitter unit 11 in any suitable manner, as by bolts, a screw-threaded coupling, or the like. The well logging apparatus also comprises a receiver unit 13 having its related electrical equipment contained in another fluidtight housing 14 that is secured to said unit 13. The transmitter unit 11 and receiver unit 13 are fixedly secured together in coaxial alignment by a connecting element 15 of predetermined length, such as 5 feet, said element 15 being either a section of a cable or rod but preferably being a short section of a tubular member having a considerably smaller diameter than the housing members and adapted to accommodate the necessary electrical conductors.

The transmitter unit 11 and the receiver unit 13 are preferably mounted in suitable protective housings which may be similar in construction, as shown in Figure 2, wherein either the transmitter or the receiver element is diagrammatically indicated at 16. The housing comprises a pair of solid head or end units 17 and 18 fixedly secured in spaced relationship by a plurality of relatively thin rod members 19 which may be secured to said end members in any suitable manner as by welding, bolting, or the like. The end units 17 and 18 are provided with means such as threaded portions 20 and 21 for connecting said housing to other parts of the logging apparatus.

The transmitter or receiver element 16 may be secured to either of the end units 17 or 18, being thus positioned in a coaxial manner substantially equidistant between said end units 17 and 18. Preferably, the transmitter and/or receiver 16 is surrounded by a tubular flexible diaphragm member 22 which is adapted to keep any contaminating well fluid away from the unit 16.

The pressure-transmitting diaphragm member 22 is preferably made of a flexible oil-resistant material such as synthetic rubber, but it may also be made of rubber, rubberized canvas, flexible sheet metal, or any elastic or resilient plastic material. If desired the diaphragm member 22 may be secured, as by cementing, bolting, or other means to the end units 17 and 18 in recessed portions thereof, as shown in Figure 2. Generally, the chamber 23 within the diaphragm 22 is filled with any suitable preferably non-conducting fluid, for example such as transformer oil, which is clean and relatively incompressible, whereby the diaphragm is prevented from collapsing when subjected to the considerable hydrostatic pressures that are encountered in deep fluid-filled wells. An additional function of the fluid inside the diaphragm is to furnish an impedance match between the sound source and the borehole wall. If desired, the chamber 23 may be filled with a gas, preferably an inert gas. It is to be understood, however, that under certain conditions the present device may be operated with the diaphragm 22 omitted and with the transmitter or receiver elements 16 in direct contact with the well fluid.

Preferably, suitable portions of units 17 and 18 within the diaphragm 22, may be recessed, as at 24 and 25, and filled with a porous material 26 and 27 such as sponge lead, unglazed ceramic, or the like, for absorbing vertical impulses, i. e., acoustic or seismic impulses that are substantially parallel to the vertical walls of the diaphragm 22. End units 17 and 18 are provided with suitable conduits 28 and 29 for receiving electrical conductors by which said transmitter unit or receiver unit may be connected to other related electrical equipment in the well logging apparatus and whereby said logging apparatus may be connected to the cable 30 at the end of which it is lowered into a borehole as shown in Figure 1. One end unit 17 is also provided with conduit means 31, containing suitable electrical leads which connect the transmitter or receiver element 16 to its related electrical equipment. The other end unit 18 may be provided with a fluidtight cable seal 48.

The transmitter is provided with a spark-type sound source. The sound source may comprise a pair of carbon electrodes 94 and 95 held in contact by metallic arms 96 and 97 which are secured to an insulating block 98 and provided with leads 99 as shown in Figure 7. Preferably, either of the sound sources shown in Figure 3 or 4 are employed. One embodiment of the sound source of the transmitter, as shown in Figures 3 and 5, comprises two spark electrodes or contacts 32 and 33 of a material such as Carboloy, which are preferably mounted on a pair of thin metallic arms 34 and 35 of any suitable conducting material, said arms being fixedly secured to an insulted base 36. Fixedly positioned betwen the contacts 32 and 33 is a third or trigger electrode 37, preferably of thin steel plate or foil, covered with a suitable insulating material 38. The essential properties of this insulating material are, first, a high dielectric constant, whereby the distance between the trigger electrode 37 and the electrodes 32 and 33 can be reduced to an extremely small value, and, second, absence of any tendency to carbonize under repeated spark discharges. For example, a very suitable material is a tetrafluoroethylene plastic material known as "Teflon." Figure 3 shows the electrode arrangement in greatly exaggerated proportions, the distance between the center line of the trigger electrode 37 and the adjacent face of either electrode 32 or 33 being actually of the order of only about .004 inch.

The three-electrode sound souarce employs a suitable energizing circuit as shown in Figure 3. The circuit comprises a power supply having a high voltage terminal 40 and a low voltage terminal 39, capacitors 41 and 42, a transformer 43 having primary and secondary windings, 44 and 45, respectively, a switch 46, and electrodes 32, 33 and 37, said circuit being grounded at 47. A suitable electronic tube may be substituted for switch 46. Capacitor 41 is charged by power source 39 and, upon the closing of switch 46, discharges through the primary winding 44 of transformer 43 thus inducing a very high voltage of the order of 15,000 volts, in the secondary winding. This high potential is applied to the trigger electrode and causes sufficient ionization in the extremely thin surface layers between said electrode and the electrodes 32 and 33 to cause a complete breakdown in the gap between electrodes 32 and 33, thus permitting capacitor 42 to discharge across said gap, producing a shock wave. In this manner, an ampulse having an extremely steep or abrupt wave front is produced. The pressure pulse should preferably have a rate of increase such that its maximum value is reached in from 2 to 10 microseconds.

Another embodiment of a sound source suitable for the use of this is shown in Figure 4. This embodiment comprises a solenoid unit having a metallic plunger or core 51 mounted for sliding movement within a non-metallic or insulating sleeve 52. The downward travel of the plunger 51 is limited by an inwardly extending flange 53 on the lower end of said sleeve 52. A solenoid winding or coil 54 surrounds the sleeve 52 near the upper end thereof and the combined plunger 51, sleeve 52 and coil are mounted in a suitable housing 55. Affixed in any suitable manner, as by welding, to the lower end of the housing 55 is an electrical contact element or plate 56 having an axial bore 57 therethrough. A second contact element 59 is fixedly secured to a downwardly extended arm 58 of the plunger 51. The contacts or electrodes 56 and 59 may be made of any suitable conducting material, but are preferably made of Carboloy, a cemented tungsten carbide alloy.

The solenoid operated sound source may be connected to any suitable operating circuit as for example the one shown in Figure 4 which comprises a power supply source 60, condensers 61 and 62, and a switch 63, said circuit being grounded at 64. A suitable electronic tube, for example a gas trigger tube of the cold-cathode type, may be substituted for switch 63. On closing the switch 63, the condenser 61 which had been previously charged, discharges through the solenoid coil 54 causing plunger 51 to be drawn upward in sleeve 52. Electrode 59 rises with said plunger 51 until electrode 59 contacts electrode 56 or until the electrodes are close enough together to permit condenser 62 to discharge across the gap between said contacts whereby a spark is generated at said contacts producing a pressure pulse having the characteristics described with regard to Figure 3.

As shown in Figure 1, the receiver 13 of the present velocity well logging equipment is normally positioned below the transmitter 11. The detector element of the receiver unit, diagrammatically represented at 16 in Figure 2, may be of any type for translating mechanical or acoustical waves or impulses into electric signals. For example, the detector means 16 may comprise a piezoelectric detector such as a tourmaline pressure gauge fixedly mounted in any suitable manner at substantially the center of the oil-filled diaphragm chamber 23 (Figure 2).

Due to the high impedance and low sensitivity of some detectors, such as a tourmaline gauge, a vacuum tube preamplifier diagrammatically indicated at 71 in Figure 1 may be mounted in the fluidtight compartment 14 adjacent the receiver unit 13. The inclusion of a preamplifier 71 in the receiver is desirable insofar as the signal from the detector may require an amplification of from 30 to 10,000 times in order to have an intensity sufficient to overcome the attenuation due to several thousand feet of cable 30 extending to surface recording equipment.

A low gain amplification stage or a transformer amplifier, diagrammatically represented at 72, is preferably connected between the preamplifier 71 and the detector means and serves as an impedance transformer with low equivalent noise input. The detector means 16, preamplifier 71 and gain stage 72 are electrically connected by suitable leads (not shown) which pass through rod 15, housing 11 and housing 12 to connect with cable 30. The sound source in the transmitter housing 11 and the related equipment carried in the adjacent housing 12 are also electrically connected to each other and to cable 30 by suitable leads, not shown. The related equipment carried in housing 12 may comprise various necessary or desirable elements, such as suitable relay and timing circuits, a bank of condensers, etc., as diagrammatically indicated at 73 and 74.

The cable 30 is preferably a shielded coaxial cable that is firmly secured to the top of the logging apparatus by a cable pressure seal or cap 75, said cable being used to raise and lower the apparatus within a well borehole, as shown in Figure 1. The logging apparatus within the well is adapted to obtain its power and to transmit signals over the same coaxial electric cable.

The transmitter 11 and receiver 13 are in vertical spaced relationship when suspended by the cable 30 in a well borehole 76 as shown in Figure 1. The distance between the transmitter 11 and receiver 13 may be of any predetermined value, which is governed by the length of the cable or rod 15 therebetween and may vary widely depending upon the formations being studied and upon the desired degree of resolving power, that is, of the ability of the system to separate adjacent strata. The spacing may be from 1 to 30 feet, but for normal operations a spacing of about 5 feet is preferred. While it is realized that the transmitter and receiver could be carried by a single elongated body member, the present design is preferred as the spacing between the instruments may be readily altered and the weight of the instrument is greatly lessened, thus obviating the use of a heavy coaxial cable for suspending it in a borehole. The use of a separate, small-diameter connection between the transmitter and receiver is also preferable in that it attenuates sound energy traveling within the instrument between the transmitter and receiver, and also minimizes distortion of the sound field by the instruments within the interval being measured.

As diagrammatically shown in Figure 1, the cable 30 passes up the borehole 76, over a sheave 77 and onto a reel 78, which is actuated by any suitable hoisting mechanism (not shown). The cable 30 from the transmitter and receiver is electrically connected or coupled to an indicating instrument at the surface such as a cathode-ray oscillograph, or any other suitable device capable of forming an electrical image of the mechanical wave reaching the receiver or of indicating the velocity of a propagation of sound waves traveling through the formation from the transmitter 11 to the receiver 13.

Although various types of equipment may be used for indicating and recording the data obtained by the receiver 13 and for supplying the transmitter 11 and receiver 13 through cable 30 with the necessary operating power, a preferred arrangement illustrated in Figure 1 comprises a Selsyn generator 80 coupled or associated with the sheave 77, collector or slip rings 81 mounted on the cable reel 78, and an operating and recording network connected or coupled therewith through cable termination and filter circuits 82, which make it possible to use a single conductor insulated cable having a protective metallic sheath as a return lead. This network comprises a main power supply 83, amplifier circuits 84, sweep circuits 85, an oscilloscope 86, a calibration wave generator 87, synchronizing circuits 88, a camera unit 89 having a suitable film feed, and depth indicator 90, all said units being electrically connected with each other as diagrammatically shown in Figure 1. In place of or in conjunction with the oscilloscope an electronic chronometer so connected as to operate a recording galvanometer may be used.

In operation, the depth of the transmitter 11 and receiver 13 in the borehole 76 is obtained at any moment from a signal sent out by the Selsyn generator as the cable 30 runs over the sheave 77. This signal is transmitted to the depth indicator 90 through a lead 91, the depth being recorded directly on the film carried by the camera 89.

In order that a spark may be generated by the transmitter 11, current sent down the cable 30 from the main power supply 83 at the surface is used to charge the condenser bank 74 carried by the transmitter. The condenser bank 74 is then discharged through the spark electrodes by the relay and timing circuits 73 which are in turn actuated by impulses delivered thereto from the surface and determined by a proper setting of the synchronizing circuits 88. Thus the spark discharge may be made to occur as a function of depths, e. g., every 5 feet, or as a function of time, e. g., every 2 seconds, etc. The spark discharge through the liquid in which the electrodes are immersed creates an impulse having a very sharp wave front which is transmitted through the flexible diaphragm 22 and the fluid on either side thereof and into the borehole wall where it is partially refracted and partially reflected, and travels, as will be explained hereinbelow both through the formation and the borehole liquid towards the receiver or detector 13. A tourmaline piezoelectric pressure gauge detector was found to have an extremely good response to a sharp pulse of the type generated by the spark electrodes. This type of detector also possesses the characteristic of responding to hydrostatic pressure directly, thus facilitating its calibration.

The signal generated by the receiver 13 is sent to the transformer-amplifier 72 and then to the preamplifier 71 where it is amplified sufficiently to permit it to travel through the cable 30 to the recording instruments at the surface without too much attenuation. The signal is transferred from the cable 30 by means of slip rings 81 to the cable termination and filter circuits 82, and thence to the amplifier 84, where it is again amplified and directed through the synchronizing circuits 88 to the oscilloscope 86 and the camera 89, setting them in operation after a short delay interval, for example, 0.5 second, during which time the cycle of recording, depth indication, sweep calibration, and film feed may take place. These operations are of a conventional nature well understood by those familiar with the art of electronics, and will not be described in detail here. For example, pulses from the sweep circuits 85 upon actuation by the signal received, may be used to turn on the beam in the oscilloscope, thus eliminating stray light from being recorded on the camera film in the intervals between records. The synchronizing circuits 88, which receive an amplified pulse from the auxiliary amplifier 84 as well as a signal from the Selsyn generator 80, send also pulses to the camera 89, for example, in order to control the magnetically operated film feed and to cause the depth indicator to be illuminated momentarily at each discharge of the sound source.

If desired, a calibration wave generator 87 may be electrically connected through the synchronizing circuits 88 to the sweep circuits 85 for the purpose of producing a periodic wave of known frequency which may also be recorded by the camera 89 to make possible absolute velocity measurements serving as a means for continually checking and calibrating the recording equipment and circuits. A typical record of a calibration wave is shown in Figure 6 at the bottom of the well log film record. The distance between each vertical line of the calibration wave may be of any desired time interval, such as 10 microseconds. This calibration wave may be supplied by any suitable oscillator. By including these means to calibrate the time axis of the oscilloscope 86 and suitably controlling the sweep circuits, wide variations of the time-axis scale, or expansion of any desired part of the record for detailed study are made possible. The calibration wave may be recorded at irregular intervals but is preferably recorded after each seismic wave recording so that each reading may be checked.

The well logging record obtained with the above-described equipment consists essentially of a series of seismograms obtained at various depths in the well. As shown in a typical section of film record in Figure 6, the corresponding depth for each seismogram may be indicated directly on the film. The time scale on the film scale, illustrated in Figure 6, is taken from left to right in a horizontal direction with zero time being at the start (left side) of the recorded seismogram.

The principle of operation, on which the present velocity well logging equipment is based, consists in producing an impulse in the fluid filling the well, or in a fluid in contact therewith through a flexible partition, and measuring the time required for the first arrival at the detector spaced a known vertical distance above the source. This is accomplished in the present invention by photographing the cathode-ray image of the oscilloscope. Since seismic wave energy travels at a faster rate through the formation adjacent the borehole than through the fluid in the borehole, the first energy wave to be received and recorded on the oscilloscope is that which is refracted through the formation. Thus, the time interval between the spark discharge and the first recorded wave is a measure of the formation seismic velocity. By comparing the recorded velocities with reference velocities of known formations, a satisfactory formation log of a well borehole may be obtained. It will be noted that a multiplicity of shots, as illustrated in Figure 6, is easily interpreted in terms of relative-velocity (dotted line) and forms a permanent record permitting detailed study of the seismograms.

In logging a well borehole the transmitter 11 and receiver 13 may be moved through the borehole at a substantially constant rate of speed such as from 50 to 150 feet per minute with repeated spark discharges being recorded as the instruments are lowered or raised. The records may likewise be made at predetermined depths in the well when the instruments are lowered in a stepwise fashion and are momentarily maintained stationary at each depth. For example, as stated above, shots taken at about five foot depth intervals or 2 seconds time intervals yield a record with sufficient data for a satisfactory log of the well borehole. Alternatively, shots may be taken at regular time intervals, for example every 2 seconds. In general, however, it is not necessary to lower the instruments in a step-wise fashion to obtain records at predetermined depths. The time required to make a record is so short (0.01 to 0.001 sec.) that the motion of the instrument has no significant effect.

While the invention is mainly applicable and has been described with reference to mechanical waves in the acoustic range, i. e., elastic waves of audible frequency, it is realized that the waves produced and measured can be in considerable measure of frequencies beyond the audible range and belonging to the ultrasonic range.

Although the well logging apparatus of the present invention was described with the receiver being suspended below the transmitter in the borehole, it is quite evident that the position of the instruments in the borehole may be readily reversed without affecting the character of the information derived from the recorded pulses.

I claim as my invention:

1. Apparatus for generating acoustic waves in a well borehole comprising transmitter means for originating a steep front mechanical wave in the borehole liquid, said transmitter means comprising two electrodes immersed in a liquid, electrical circuit means for applying a potential between said two electrodes, a trigger electrode positioned in said liquid between said two electrodes, and electrical circuit means for applying between said trigger electrode and at least one of said two electrodes a potential having a sufficiently high value to initiate ionization in the space between said two electrodes, whereby a spark discharge is produced through the liquid between said two electrodes by the potential applied thereto.

2. Apparatus for generating acoustic waves in a well borehole comprising transmitter means for originating a steep front mechanical wave in the borehole liquid, said transmitter means comprising two electrodes immersed in a liquid, first condenser means for applying a potential between said two electrodes, an insulated trigger electrode positioned in said liquid between said two electrodes, and second condenser means for applying between said trigger electrode and at least one of said two electrodes a potential having a sufficiently high value to initiate ionization in the space between said two electrodes, whereby a spark discharge is produced through the liquid between said two electrodes by the potential applied thereto.

3. Apparatus for generating acoustic waves in a liquid-filled well borehole, comprising transmitter means for originating a steep front mechanical wave in a liquid within the borehole, said transmitter means comprising two electrodes immersed in a liquid, electrical circuit means for applying a potential between said two electrodes, a trigger electrode positioned in said liquid between said two electrodes, cylindrical diaphragm means surrounding said electrodes for transmitting a mechanical wave from the liquid immediately surrounding said electrodes to the borehole liquid, and electrical circuit means for applying between said trigger electrode and at least one of said two electrodes a potential having a sufficiently high value to initiate ionization in the space between said two electrodes, whereby a spark discharge is produced through the liquid by said two electrodes by the potential applied thereto.

4. Apparatus for generating acoustic waves in a well borehole comprising a transmitter comprising a housing having a cage portion open to the well liquid, a cylindrical flexible partition carried by said housing to form a closed compartment adapted to be filled with fluid within said cage portion, said cylindrical flexible partition being in contact with the well liquid on its outer side and with the liquid within said compartment on its inner side, two electrodes carried by said housing within said compartment and immersed in the liquid therein, a trigger electrode positioned in said liquid between said two electrodes, and electrical circuit means extending through said housing and connected to said electrodes for applying thereto an electrical potential sufficiently high to produce a spark discharge between said electrodes, whereby a steep front mechanical wave is transmitted in all radial directions to the well liquid through the liquid surrounding said electrodes in said cylindrical flexible partition.

CHARLES B. VOGEL.

References Cited in the file of this patent

UNITED STATES PATENTS

| Number | Name | Date |
|---|---|---|
| 1,500,243 | Hammond, Jr. | July 8, 1924 |
| 1,685,075 | Lindenblad | Sept. 18, 1928 |
| 1,758,993 | Wolff | May 20, 1930 |
| 2,056,301 | Schroter | Oct. 6, 1936 |
| 2,167,536 | Suits | July 25, 1939 |
| 2,191,119 | Schlumberger | Feb. 20, 1940 |
| 2,233,992 | Wyckoff | Mar. 4, 1941 |
| 2,275,736 | Cloud | Mar. 10, 1942 |
| 2,350,371 | Smith | June 6, 1944 |
| 2,403,990 | Mason | July 16, 1946 |
| 2,478,908 | Edgerton | Aug. 16, 1949 |
| 2,595,241 | Goble | May 6, 1952 |

FOREIGN PATENTS

| Number | Country | Date |
|---|---|---|
| 4,967 | Great Britain | Feb. 28, 1910 |